(12) United States Patent
Kim et al.

(10) Patent No.: US 9,430,844 B2
(45) Date of Patent: Aug. 30, 2016

(54) AUTOMATED MAMMOGRAPHIC DENSITY ESTIMATION AND DISPLAY METHOD USING PRIOR PROBABILITY INFORMATION, SYSTEM FOR THE SAME, AND MEDIA STORING COMPUTER PROGRAM FOR THE SAME

(71) Applicant: Seoul National University R&DB Foundation, Seoul (KR)

(72) Inventors: Jong Hyo Kim, Seoul (KR); Youngwoo Kim, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 158 days.

(21) Appl. No.: 14/261,376

(22) Filed: Apr. 24, 2014

(65) Prior Publication Data

US 2015/0036906 A1 Feb. 5, 2015

(30) Foreign Application Priority Data

Aug. 2, 2013 (KR) ........................ 10-2013-0091830

(51) Int. Cl.
*G06K 9/00* (2006.01)
*G06T 7/00* (2006.01)
*G06T 11/00* (2006.01)

(52) U.S. Cl.
CPC ............ *G06T 7/0087* (2013.01); *G06T 7/0012* (2013.01); *G06T 7/0081* (2013.01); *G06T 11/001* (2013.01); *G06T 2207/10116* (2013.01); *G06T 2207/20008* (2013.01); *G06T 2207/20076* (2013.01); *G06T 2207/20104* (2013.01); *G06T 2207/20161* (2013.01); *G06T 2207/30068* (2013.01); *G06T 2207/30096* (2013.01)

(58) Field of Classification Search
CPC .................. G06T 2207/30068; G06T 7/0012; G06T 11/001; G06T 2207/20076; G06T 7/0024; G06T 7/0087; G06T 11/60; G06T 2207/10116; G06T 2207/10124; G06T 2207/20008; G06T 2207/20104; G06T 2207/20161; G06T 2207/30096; G06T 7/0081; G06T 7/0097
See application file for complete search history.

(56) References Cited

U.S. PATENT DOCUMENTS

2010/0124364 A1* 5/2010 Huo ...................... G06T 7/0012
382/128

* cited by examiner

*Primary Examiner* — Tom Y Lu
(74) *Attorney, Agent, or Firm* — Rabin & Berdo, P.C.

(57) ABSTRACT

Disclosed is an automated mammographic density estimation method using statistical image information, the method including a preprocessing step of reading the mammogram, segmenting a breast area and shifting pixel values; a step of constructing a tissue probability map in which population-based probability information is extracted, and a probability map for glandular and adipose tissues is constructed; and a density estimation step in which a breast area is segmented based on the constructed tissue probability map and a mammographic density is calculated.

14 Claims, 21 Drawing Sheets

AUTOMATED MAMMOGRAPHIC DENSITY ESTIMATION AND DISPLAY METHOD USING PRIOR PROBABILITY INFORMATION, SYSTEM FOR THE SAME, AND MEDIA STORING COMPUTER PROGRAM FOR THE SAME

BACKGROUND OF THE INVENTION (a) Field of the Invention

The present invention relates to an automated mammographic density estimation and display method, an automated mammographic density estimation system for the same, and a media for storing a computer program for the method, and more particularly to a breast area segmentation and automated mammographic density estimation and display method based on prior probability information, an automated mammographic density estimation system for the same, and a media for storing a computer program for the method, in which learned knowledge of expert readers is incorporated into the prior probability information and used as a basis in estimating the mammographic density, thereby allowing more reliable and accurate mammographic density estimation.

(b) Description of the Related Art

Breast cancer is one of the most significant health issues worldwide. According to the reported statistics, approximately 1 in 8 women will develop invasive breast cancer over the course of their lifetime, and breast cancer is the second leading cause of the mortality among women in Unite States.

Prognosis factors of the breast cancer includes physiologically important factors such as histological differentiation, axillary lymph node metastasis, a tumor size, age at onset, whether estrogen and progesterone receptors are positive or not, whether c-erbB2 receptors are positive or not, and so on. However, with recent development of mammography, a mammogram has been widely used as an early screening test before checking up such factors.

In North America and Europe, screening mammography has been carried out under the national support since the 1960s, and it has been reported that a death rate from the breast cancer was reduced as a result from trying to early detect the breast cancer. Through the mammogram, a mass or a microcalcification is generally detected to estimate a risk of the breast cancer. However, overall breast density in the mammography has also recently been used a lot for canner screening.

Meanwhile, Wolfe, et al. has asserted that the mammographic density correlates with the risk of the caner occurrence, and many studies have reported that higher mammographic density is an independent risk factor for the bread caner occurrence even though it reduces a breast cancer detection rate in the mammography.

The mammographic density refers to a proportion of glandular tissues within the breast area as depicted by mammogram, in which a qualitative estimation method is typically used to classify the mammographic density according to breast imagine reporting and data system (BI-RADS).

Thus, the mammographic density in the mammogram is widely accepted as a useful factor in the early detection for the bread cancer and is being used in such a manner that a reading doctor qualitatively determines the proportion of the glandular tissues observed in the mammogram with his/her naked eyes. However, the mammographic density as estimated by such a qualitative way is known to suffer significant variation depending on observer's experience as well as observer's physiologic condition, which leads to a high degree of inter-observer and intra-observer variabilities.

Accordingly, a computer-aided diagnosis (CAD) has been actively studied for an objective, quantitative and accurate estimation of mammographic density.

Regarding to this, the paper published in 1994 by the Byng study group in University of Toronto, as one of pioneering study groups, is based on a method where two radiologists first distinguish the breast area from the mammogram through the first thresholding and then distinguish the glandular tissues again through the second thresholding. This method is regarded as a pioneering study in the field of computer assisted estimation of the mammographic density, but has disadvantages that reproducibility is deteriorated and a great deal of care is required because the estimation is manually carried out. Also, Zhou et al. in University of Michigan employed a method that histogram characteristics of the breast area are sorted into four BI-RADS categories and corresponding thresholding is automatically implemented, thereby distinguishing the glandular tissues. Further, Saha et al. in University of Pennsylvania defined a certain region in the histogram of the breast area as a seed region and used a fuzzy connectivity method based on the seed region, thereby automatically estimating the mammographic density. Lately, Oliver et al. in University of Girona distinguished the tissues having similar characteristics through a C-means clustering method, and classified the distinguished clusters into the BI-RADS categories through a Combined Bayesian method.

The present invention discloses an automated mammographic density estimation and display method based on prior probability information, in which learned knowledge of expert readers is incorporated into the prior probability information and used as a basis in estimating the mammographic density, thereby allowing more reliable and accurate mammographic density estimation.

SUMMARY OF THE INVENTION

In accordance with an aspect of the present invention, there is provided an automated mammographic density estimation method using prior probability information, the method including steps of: constructing a population-based tissue probability map (PTPM) by extracting tissue probability information from a plurality image area previously segmented by at least one expert according to fatty and glandular tissue types in a preprocessed mammogram of a population; and estimating the mammographic density by applying the population-based tissue probability map to a preprocessed interest mammogram to obtain pixel-wise tissue probability followed by calculating the percent mammographic density.

The above preprocessing may include setting the increase in pixel values to have the same direction as the increase in X-ray attenuation, segmenting breast area from mammogram, and shifting the pixel values in the segmented breast area.

The said segmenting breast area in the preprocessing includes taking a mode value of an image histogram, obtaining a standard deviation in a histogram range having a Gaussian form centered on the mode value, determining a threshold pixel value of the breast area by a weighted sum of the said mode value and the said standard deviation, and performing thresholding.

The said shifting of pixel values in the preprocessing may be achieved by subtracting an offset intensity from all pixel values in the breast area. Specifically, the offset intensity may be determined as a pixel value at which a histogram value obtained from the segmented breast area first reaches a preset threshold.

The extracting tissue probability information in constructing the population-based tissue probability map may include calculating a local statistical feature set from multiple regions of interest within the image area previously segmented by at least one expert according to the glandular and fatty tissue types.

The constructing the population-based tissue probability map (PTPM) may include deriving the tissue probability density functions according to the glandular and fatty tissue types, and obtaining the proportion of each tissue probability density function to the sum of the glandular and fatty tissue probability density functions. Preferably, the local mean and the standard deviation may be used as the local statistical feature set, and the said tissue probability density function can be derived by smoothing the probability density of local statistical feature set in a feature space for each tissue type.

The pixel-wise tissue probability in the density estimation step may be obtained by setting up a local region of interest centered at each pixel in the breast area followed by calculating a statistical feature set and applying it to the population-based tissue probability map (PTPM). With the aforementioned method, if the tissue probability of the respective pixels for the glandular tissue and the adipose tissue are obtained, it is possible to easily estimate the mammographic density of a given mammogram by utilizing the obtained pixel-based probability information.

In one embodiment, the average probability of the glandular tissues may be obtained with regard to all pixels in the breast area to represent the mammographic density.

In another embodiment, a dense region may be first segmented in the breast area. For example, pixels having the 50% or higher probability of glandular tissue may be selected to segment the dense region. As an alternative, the pixel-wise tissue probability may be combined to a region-based level set segmentation method so as to more generally reflect the region features. In the case that the dense region is segmented in the breast area, the mammographic density can be calculated by a proportion of the segmented dense region to the entire breast area.

In accordance with another aspect of the present invention, there is provided a method of displaying the estimation result, the method including: generating an evidential image in which the basis data of respective pixels in the intermediate estimation result are color coded and overlaid on the interest mammogram; displaying text characters corresponding to the estimation results on the evidential image. This allows a user to verify the appropriateness of estimation results.

In accordance with another aspect of the present invention, there is provided an automated mammographic density estimation system for carrying out the foregoing automated mammographic density estimation method.

In accordance with another aspect of the present invention, there is provided a media for storing a computer program, wherein the computer program stored in the media includes a computer algorithm provided for implementing the foregoing automated mammographic density estimation method.

BRIEF DESCRIPTION OF THE DRAWINGS

The above and/or other aspects of the present invention will become apparent and more readily appreciated from the following description of the exemplary embodiments, taken in conjunction with the accompanying drawings, in which:

FIG. 3A: before pixel value shift and FIG. 3B: after pixel value shift;

FIG. 4A: before the pixel value shift and FIG. 4B: after the pixel value shift;

FIG. 5A: optimal boundaries of glandular tissue drawn by an expert, and FIG. 5B: local ROIs within a dense region (red circles) and a fatty region (green circles);

FIG. 8A: a glandular tissue selection result by an expert, FIG. 8B: color coding of the pixel-wise probability for glandular tissue, and FIG. 8C: color coding of the pixel-wise probability for fatty tissue;

FIGS. 9A, 9B, 9C, 9D, 9E and 9F respectively show an example of dense region segmentation process for the mammographic density estimation, in which an initial contour is converged to an outline of the dense region as time goes on. FIG. 9A: the initial contour, FIG. 9B: after 5 iterations, FIG. 9C: after 10 iterations, FIG. 9D: after 30 iterations, FIG. 9E: after 100 iterations, and FIG. 9F: a final estimation result;

DETAILED DESCRIPTION OF THE EMBODIMENTS

Figure 1:
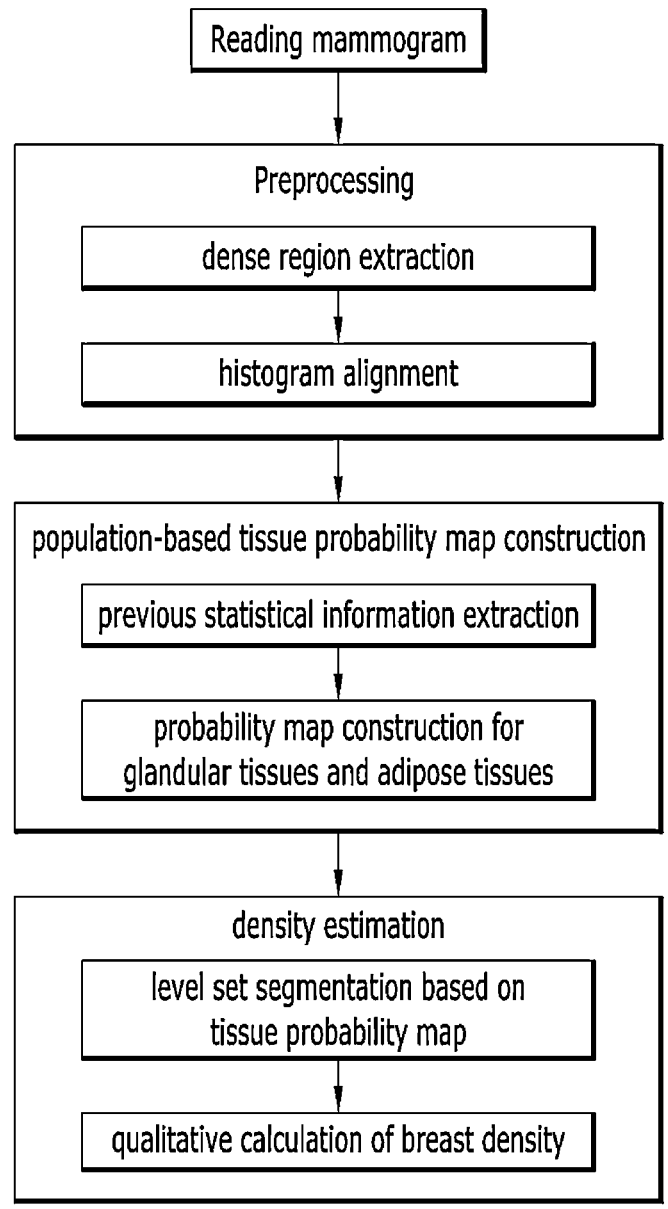
FIG. 1 is a flowchart of an automated mammographic density estimation method based on prior probability information in a mammogram according to an embodiment of the present invention.

Below, exemplary embodiments according to the present invention will be described in detail with reference to accompanying drawings. It should be noted that the terms or words used in this specification and claims have to be interpreted as the meaning and concept adaptive to the technical idea of the present invention rather than typical or dictionary interpretation. Therefore, embodiments disclosed in this specification and configurations illustrated in the drawings are nothing but preferred examples of the present invention and do not fully describe the technical idea of the present invention, and it is to be thus appreciated that there can be various equivalents and alterations replacing them at a filing date of the present application.

FIG. 1 is a flowchart of an automated mammographic density estimation method based on prior probability information in a mammogram according to an embodiment of the present invention;

As shown in the flowchart of FIG. 1, the present invention includes the steps of reading a mammogram data set of a population obtained from the mammography, undergoing preprocessing, extracting local probability information according to dense and fatty regions previously segmented by at least one expert reader, constructing a population-based tissue probability map (PTPM) of glandular and adipose tissues, reading a given mammogram based on the constructed population-based tissue probability map (PTPM), obtaining pixel-wise probability of the glandular and adipose tissues, and calculating the density of a breast based on the obtained pixel-wise probabilities.

In particular, according to an exemplary embodiment, learned knowledge of experts is obtained in the form of prior probability information which leads to the construction of population-based tissue probability map (PTPM) so as to help effectively segment the glandular tissues from the surrounding adipose tissues. Thus, a unique estimation method according to the present invention employs the population-based tissue probability map (PTPM) in estimating the density of the given mammogram.

Detailed descriptions of the configurations and functions of the present invention are as follows. Throughout this specification, a dense region refers to an area which corresponds to radio-dense tissues including glandular, fibrous and epithelial tissues, whereas a fatty region refers to an area which corresponds to radiolucent adipose tissues on mammograms.

1. Preprocessing

Figure 2:
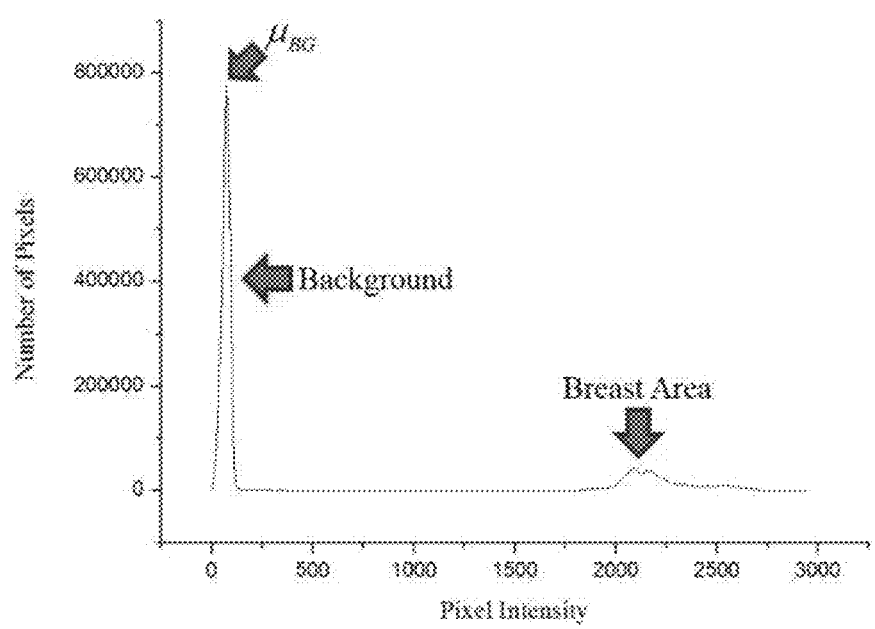
FIG. 2 is a graph showing a method of distinguishing the breast area from background area using a histogram of the mammogram.

To segment the breast area from the mammogram, a histogram characteristic in the mammogram as shown in FIG. 2 is used.

As shown in FIG. 2, a histogram shape of a full-field digital mammography (FFDM) is bimodal, in which the first peak corresponds to the background and the second peak corresponds to the breast area. The first peak is distinct in showing a narrow and sharper shape due to uniform X-ray transmittance in the background area. Paying attention to this unique property, it is possible to model the background peak as a Gaussian distribution. On an assumption that the histogram of FIG. 2 includes two Gaussian distributions, the mode value of the entire histogram indicates a mean value $\mu_{BG}$ of the background area, and thus the following Formulas may be used to calculate the mean value and the standard deviation $\sigma_{BG}$ of background area.

$$\mu_{BG} = \mathrm{argmax} H(i) \quad \text{[Formula 1]}$$

$$\begin{cases} \sigma_{BG} = \sqrt{\dfrac{1}{N_{BG}} \sum_{i=0}^{\mu_{BG}} H(i)(i - \mu_{BG})^2} \\ N_{BG} = \sum_{i=0}^{\mu_{BG}} H(i) \end{cases} \quad \text{[Formula 2]}$$

where, i is an intensity level of mammogram, and H(i) is the histogram value of i. Based on the probability information of the background area calculated by Formulas 1 and 2, a threshold $t_B$ corresponding to the breast area is calculated, and then those pixels having a higher value than the threshold are regarded as the breast area.

$$t_B = \mu_{BG} + K \cdot \sigma_{BG} \quad \text{[Formula 3]}$$

$$\Omega_B = \{x \mid f(x) > t_B\} \quad \text{[Formula 4]}$$

The breast area $\Omega_B$ is segmented, as in Formula 4, by applying an adaptive threshold determined by Formula 3, where K in Formula 3 is a preset constant. In Formula 4, f(x) indicates an intensity value at a position x=(x, y) in an image.

The next step, i.e., pixel value shift is essential to estimate the prior probability information and density in the mammogram robustly. The mammograms of the patient population exhibits diverse patterns of the intensity distribution arising from differences in the breast thickness, exposure conditions, tube type-filter combinations as well as the grid types. This diversity of intensity distribution makes it necessary to introduce an intermediate processing step to compensate the intensity range variation before proceeding to the subsequent steps.

Figure 3A:
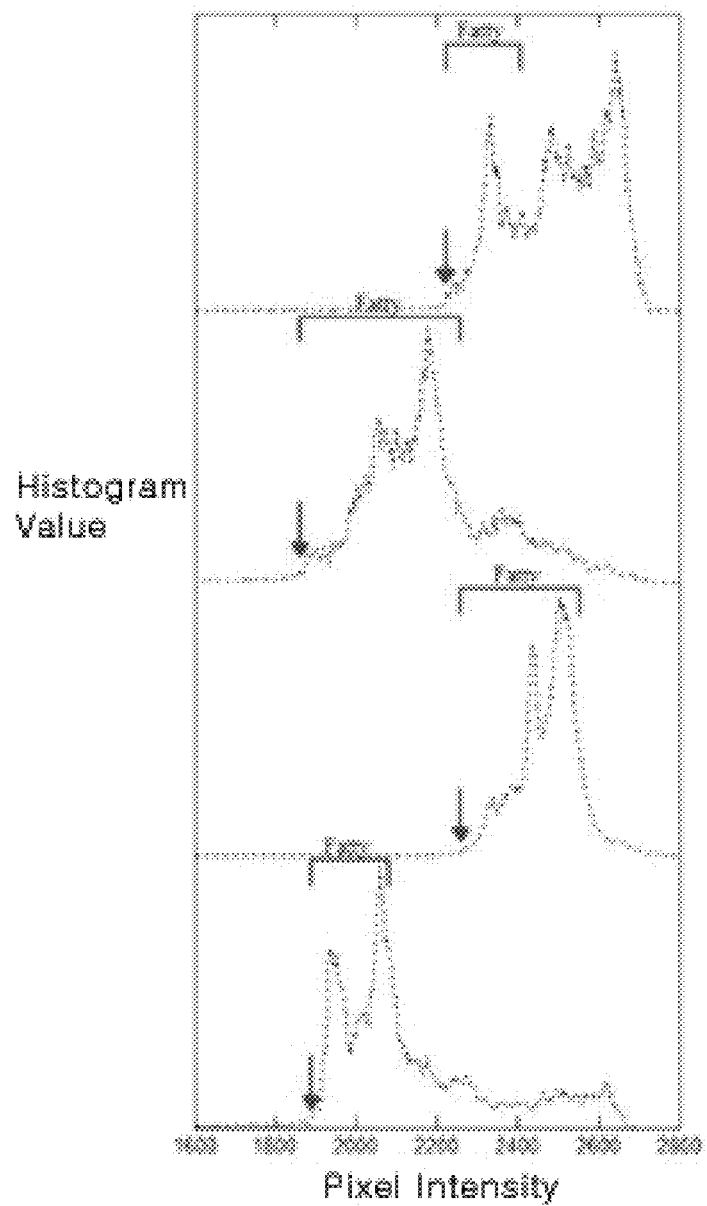
FIGS. 3A and 3B show effect of histogram alignment by pixel value shift.

As shown in FIG. 3A, the histograms before the pixel value shift have inconsistent intensity ranges. Therefore, if the intensity ranges are not consistently aligned with each other, it is difficult to distinguish the statistical features between the dense and fatty regions as shown in FIG. 4A. In particular, the fatty region is distributed in a considerably wide intensity range. Alternatively, if the pixel values are shifted by the following Formulas, the intensity ranges are consistently aligned on the histogram as shown in FIG. 3B, and the distribution of the statistical values become clearly distinct between the dense rand the fatty regions as shown in FIG. 4B.

Figure 3B:
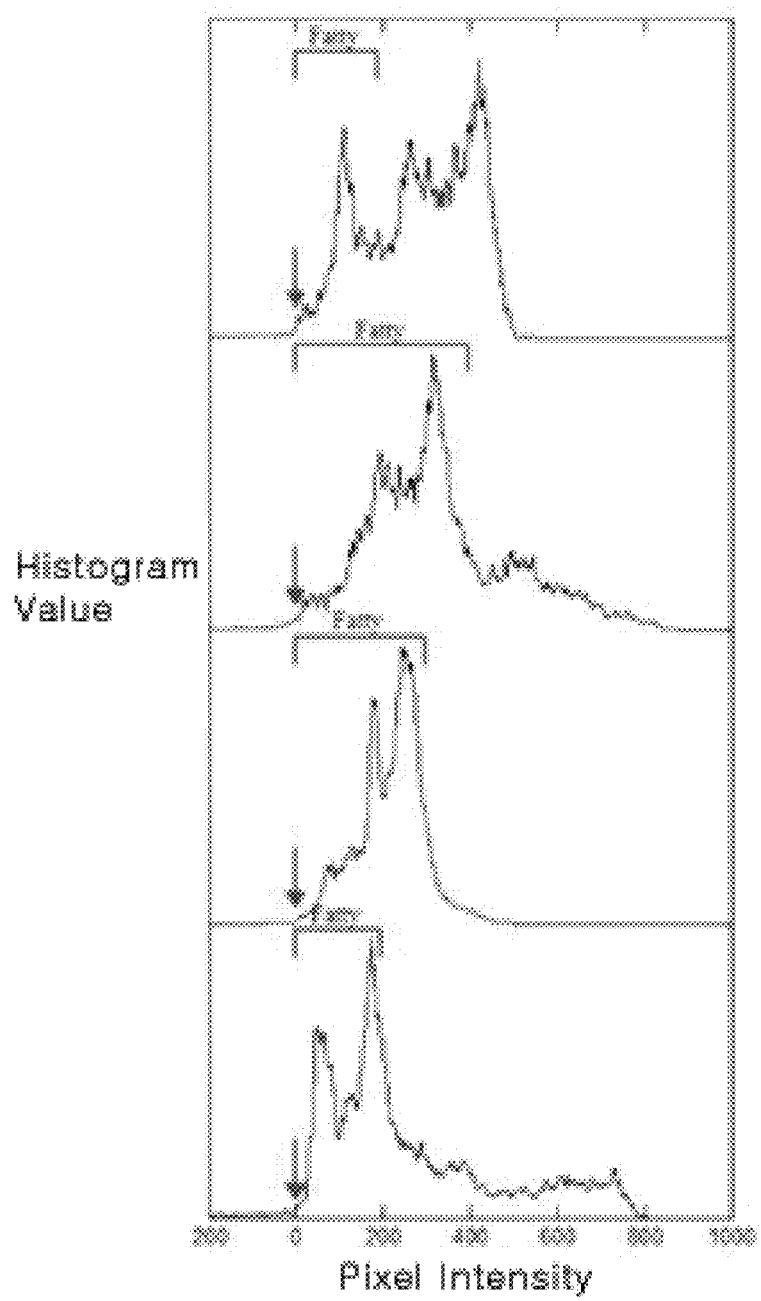
Figure 4A:
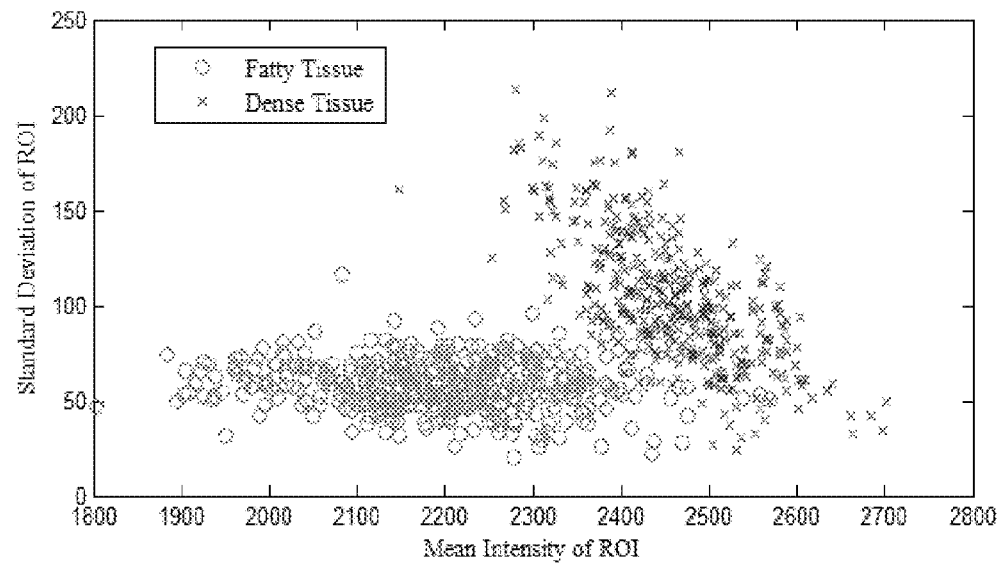
FIGS. 4A and 4B are two-dimensional (2D) scatter plot of mean and standard deviation before and after the pixel value shift.
Figure 4B:
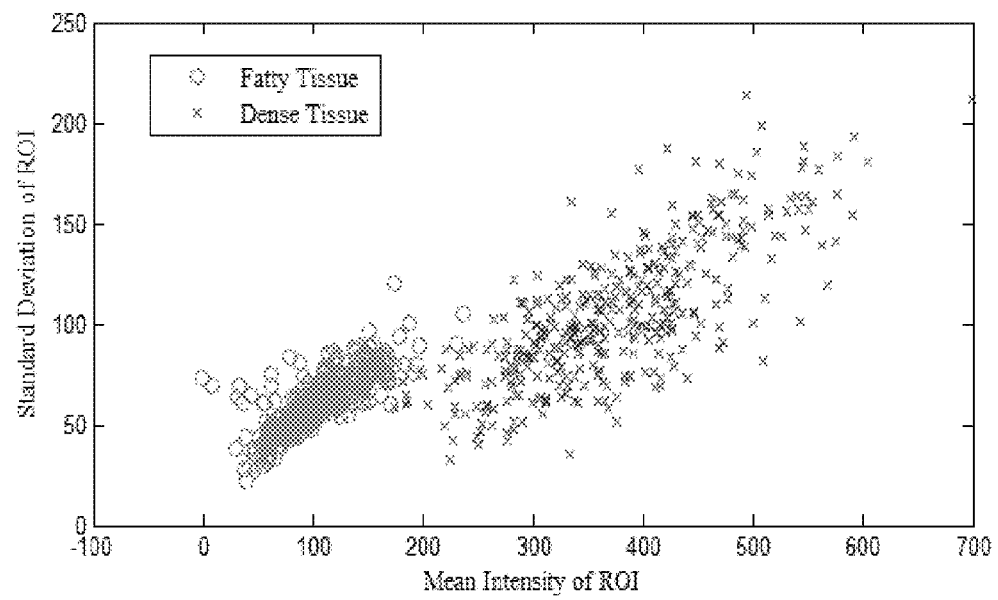

FIGS. 3A and 3B show examples of the intensity range of the breast area in four typical FFDM cases. The first step in the intensity range alignment process is to determine the offset intensity $i_{off}$ which is the leading edge of the histogram slope for the breast area. Using this leading edge as a reference value, the intensity ranges of the mammograms can be aligned to have more consistent distribution. The determination of $i_{off}$ and the pixel value shift operation are carried out according to the following Formulas 5 and 6, respectively.

$$i_{off} = \underset{i > t_B}{\mathrm{argmin}}(H(i) > M) \quad \text{[Formula 5]}$$

$$\hat{f}(x) = \underset{i > t_B}{f(x) - i_{off}}, \forall\, x \in \Omega_B \quad \text{[Formula 6]}$$

In Formula 5, M is a constant parameter previously set up to seek a substantive leading edge of the histogram within the breast area. The offset pixel value $i_{off}$ obtained by Formula 5 is indicated by red arrows in FIGS. 3A and 3B.

That is, in Formula 5, M is a constant parameter specifying the minimum threshold of the histogram. Thus, this scheme seeks the value of $i_{off}$, the leading edge of the histogram within the breast area, which is then subtracted from all pixel values in the breast area $\Omega_B$ to provide the shift to the histogram. Referring to the results shown in FIG. 3B, the histogram of example mammograms are aligned to give much more consistent intensity values for the fatty region as compared to those before the pixel value shift. This intensity-aligned image $\hat{f}(x)$ is used for the subsequent processing.

In addition, the effect of pixel value shift is verified with a selected set of mammograms by examining scatters of the local statistics according to previously segmented tissues. Compared in FIGS. 4A and 4B are 2D scatter plots of the local mean and the standard deviation before the pixel value shift as shown in FIG. 4A and after the pixel value shift as shown in FIG. 4B. This figure clearly shows that the intermixed distribution of the local statistics for the adipose and glandular tissues in the original data as shown in FIG. 4A are well separated after applying the pixel value shift as shown in FIG. 4B.

2. Construction of Population-Based Tissue Probability Map (PTPM)

Figure 5A:
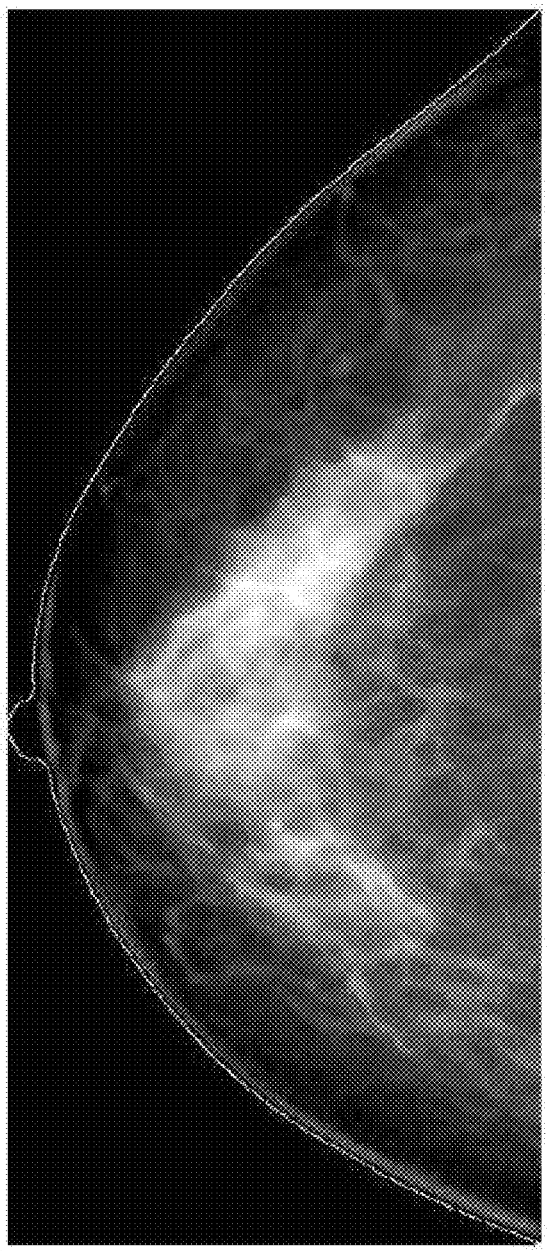
FIGS. 5A and 5B respectively show examples of selecting a local region-of-interest (ROI) according to tissue types.

This step is to extract learned knowledge of experts as the probability information and construct it into the population-based probability map (PTPM), in which local statistics according to tissue types are extracted based on the prior results of separation between the dense and fatty regions obtained by the experts as shown in FIG. 5A.

That is, this step involves a procedure wherein the mammogram reading experts to determine the boundary between the two regions using an interactive thresholding technique. The breast area is first segmented automatically by applying the foregoing histogram modeling technique so that the experts can determine the boundary more conveniently. Therefore, the experts determine a threshold where the dense and the fatty regions are well separated within the breast area using an interactive thresholding technique. In FIG. 5A, an exemplary boundary between the glandular and the adipose tissues, drawn by the threshold determined by an expert, is depicted in red.

Once the region boundaries between the dense and the fatty regions are determined by the expert, the region-of-interests (ROIs) for each tissue are automatically defined. Here, $\Omega_D$ and $\Omega_F$ are used as symbols for the respectively regions of the glandular tissues and the adipose tissues, and $\Omega_D \cup \Omega_F = \Omega_B$, and $\Omega_D \cap \Omega_F = \Phi$ are satisfied.

Figure 5B:
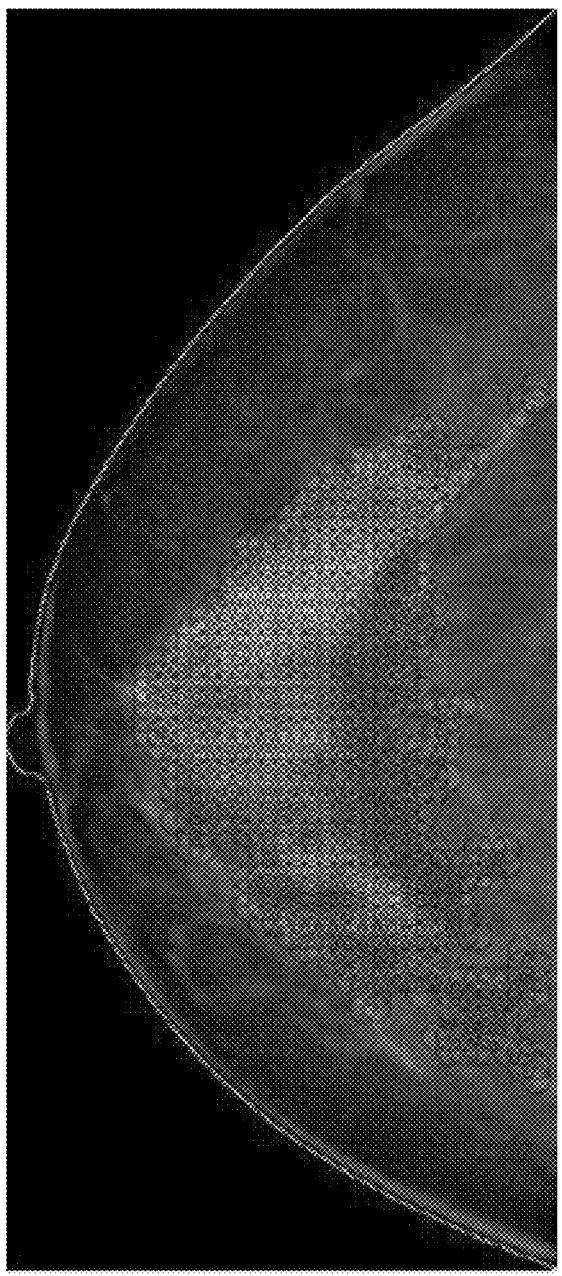

Next, the local neighborhood of each given pixel $x_0=(x_0, y_0)$ within the dense and fatty regions is defined.

$$B_r^k(x_0) = \{x \in \Omega_k \mid d(x, x_0) \leq r\} \qquad \text{[Formula 7]}$$

$$n(B_r^k(x_0) \cap \Omega_k)/n(B_r^k(x_0)) > \kappa, 0 < \kappa \leq 1 \qquad \text{[Formula 8]}$$

where, k is a subset indicator that can be either D or F according to the depending on the region being dense or fatty region; $d(\cdot)$ is the Euclidean distance of two points; $n(\cdot)$ is the number of elements in the set; and $\kappa$ is the portion that specifies the minimum number of elements in $B_r^k(x_0)$ included in $\Omega_k$. In other words, $B_r^k(x_0)$ is referred to as a closed ball with radius r centered at $x_0$. Using the closed ball in Formula 7 with respect to the condition of Formula 8, the entire mammogram is scanned at an interval of r, and the ROI satisfying Formula 8 is assigned to either $\Omega_D$ or $\Omega_F$. In FIG. 5B, the selected ROIs of the dense and fatty regions are overlaid on a mammogram as red and green circles, respectively. From such selected local ROIs, a set of local statistics features are extracted. The extracted local statistics set may be the mean value and the standard deviation which can be calculated by the following Formula 9.

$$\mu_l^k(x) = \sum_{j \in B_r^k(x)} \hat{f}(j)/n(B_r^k(x)) \qquad \text{[Formula 9]}$$

$$\sigma_l^k(x) = \sum_{j \in B_r^k(x)} \left(\hat{f}(j) - \mu_l^k(x)\right)^2 / (n(B_r^k(x)) - 1) \qquad \text{[Formula 10]}$$

where, l denotes the index for each statistical feature for identifying each training sample.

Figure 6:
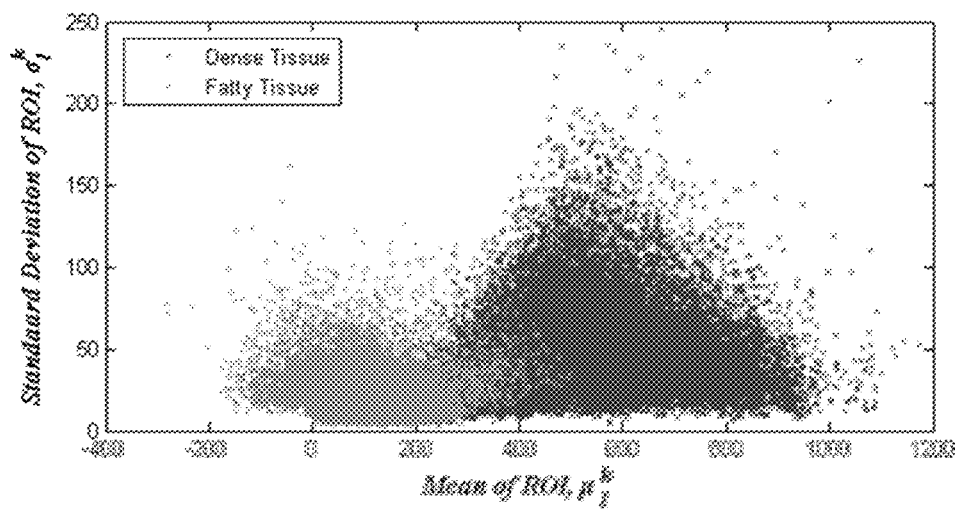
FIG. 6 is a 2D scatter plot of mean and standard deviation of local probability information respectively obtained from the dense region and the fatty region.

FIG. 6 shows a 2D scatter plot of the mean value and the standard deviation obtained using the foregoing Formulas in the dense and the fatty regions. It shows that the statistical feature of the dense region is well separated from that of the fatty region.

In the next step of constructing the population-based tissue probability map (PTPM), the obtained local statistics are used to estimate the probability density functions (PDFs) for the dense and fatty regions, respectively, which are used in constructing the probability map.

First, a nonparametric PDF estimation scheme may be employed for obtaining the PDFs according to the respective tissues, which is particularly useful when no prior information is available. As compared to a parametric probability density estimation scheme, the nonparametric probability density estimation scheme has an advantage that the PDF can include even outliers relatively far from the statistical population. The PDFs according to the respective tissues may be estimated using the nonparametric probability density estimation scheme termed Parzen Window, by the following Formula.

$$\hat{p}^k(s_l^k; h) = \frac{1}{N^k} \sum_{n=1}^{N^k} K(s_l^k; s_n^k, h) \qquad \text{[Formula 11]}$$

In Formula 11, k is an identifier of each tissue; $s_l^k \in R^2$ is a feature set where $s_l^k = (\mu_l^k, \sigma_l^k)$; $N^k$ is the total number of data points from a subset $\Omega_D$ and $\Omega_F$; and $K(\cdot; s_n^k, h)$ is a kernel function centered on $s_n^k$ with a window scale parameter h.

Finally, the probability density function values according to the respective tissues at respective points in the statistical feature space are divided by the sum of the probability density function values of the two tissue types with respect to the glandular and adipose tissues, thereby constructing the population-based tissue probability map (PTPM). At this time, the population-based tissue probability map (PTPM) refers to the probability that a statistical feature set belongs to either the glandular or the adipose tissue, which can be useful in estimating the breast density for a given mammogram.

Formulas 12 and 13 show a method of constructing the population-based tissue probability map (PTPM) through the PDF estimated by Formula 11.

$$C_D(s) = \frac{\hat{p}^D(s)}{\hat{p}^D(s) + \hat{p}^F(s)} \qquad \text{[Formula 12]}$$

$$C_F(s) = 1 - C_D(s) \qquad \text{[Formula 13]}$$

Figure 7:
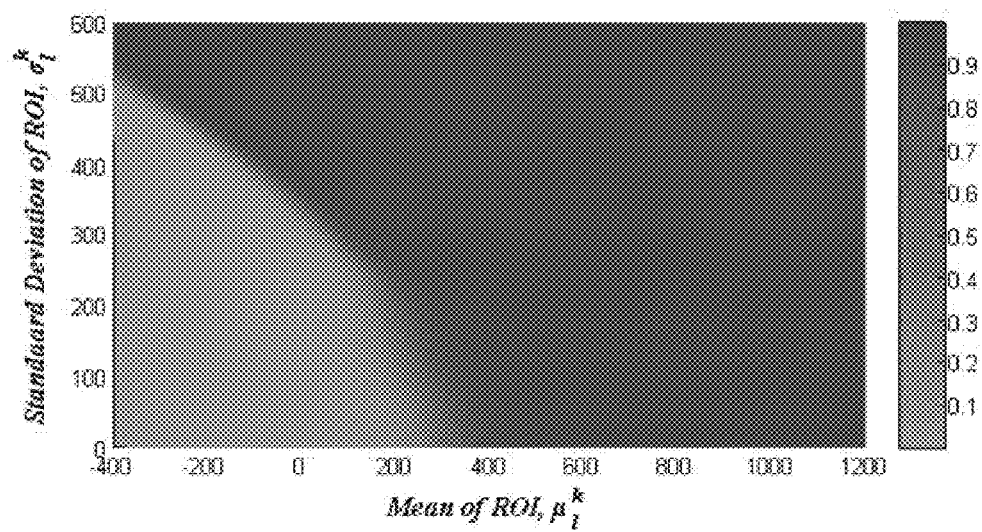
FIG. 7 is the population-based tissue probability map (PTPM) for the glandular tissue.

FIG. 7 shows an exemplary probability map for the glandular tissue constructed using the foregoing formula, which reflects the knowledge learned from experts with respect to the mammogram of the population, and constitutes one of unique technical elements of the present invention.

3. Density Estimation

By applying the population-based tissue probability map (PTPM) constructed by the aforementioned method to a given mammogram, it is possible to obtain the pixel-wise tissue probability for either glandular or the adipose tissue. That is, if a statistical feature set is obtained within the local ROI centered at each pixel and then applied to the glandular tissue probability map, it is possible to obtain the pixel-wise probability for the glandular tissue. Alternatively, if the statistical feature set is applied to the adipose tissue probability map, it is possible to obtain the pixel-wise probability for the adipose tissue.

In one exemplary embodiments, wherein the statistical feature set constitute the local mean and standard deviation, a method of obtaining the probability for the tissues at a given pixel is represented in the following Formula 14.

$$P_k(x) = C_k(s) = C_k(\mu(x), \sigma(x))$$ [Formula 14]

Referring to the foregoing Formula, the mean value and the standard deviation in the local surrounding region at the pixel position x within a given mammogram are calculated and then applied to the population-based tissue probability map (PTPM), thereby calculating the pixel-wise tissue probability for either glandular or adipose tissue.

Figure 8A:
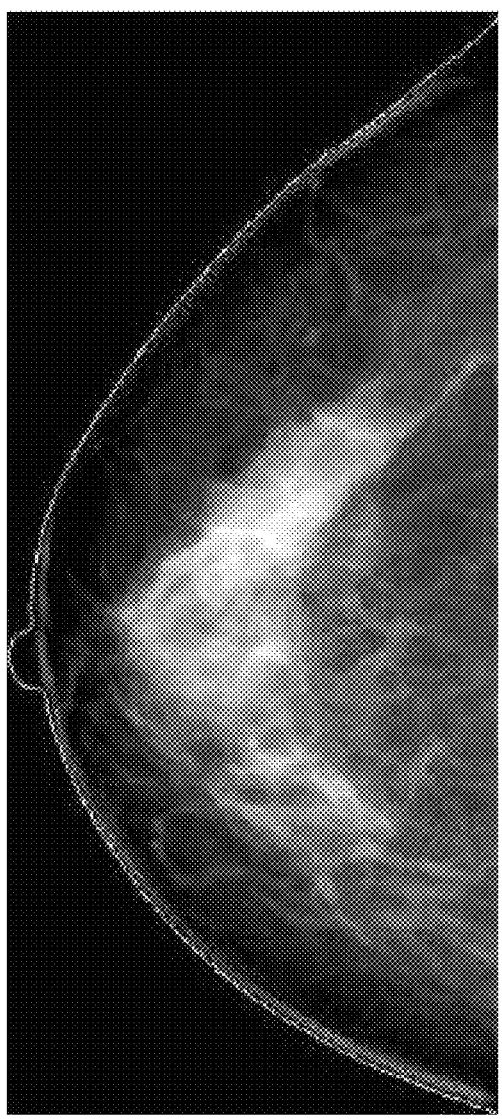
FIGS. 8A, 8B and 8C respectively show an example where the PTPM is applied to a given mammogram.
Figure 8B:
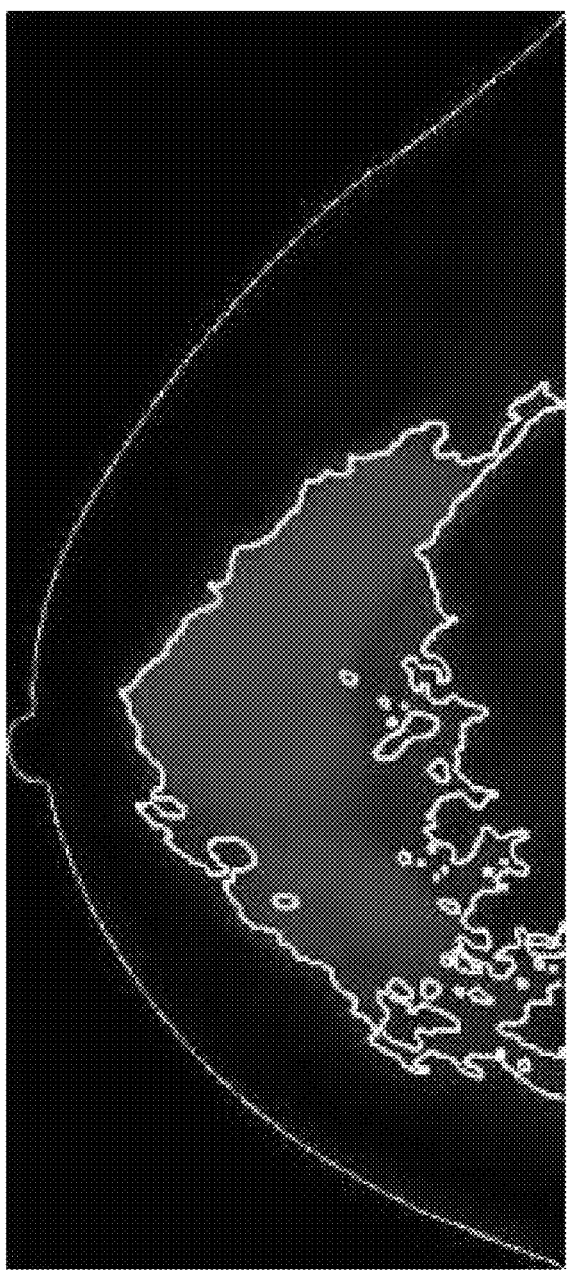
Figure 8C:
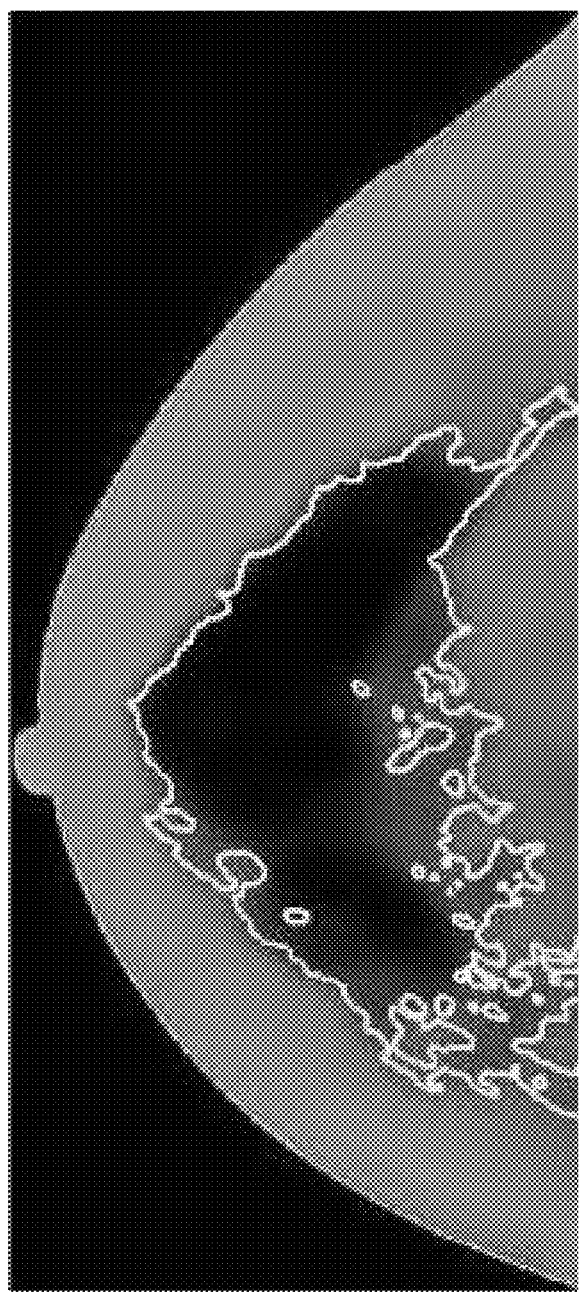

In FIGS. 8A, 8B and 8C, the calculated pixel-wise tissue probability for the respective tissues of a given mammogram are represented as a color saturation level, in which FIG. 8A shows a mammographic density estimation result from an expert, FIG. 8B shows the pixel-wise probability ($P_D$) for dense region, and FIG. 8C shows a the pixel-wise probability ($P_F$) for fatty region. Here, red represents the probability for the glandular tissue, and green represents the probability for adipose tissue.

According to an exemplary embodiment, the mammographic density is estimated based on the foregoing pixel-wise tissue probability of the mammogram.

According to one exemplary embodiment, the pixel-wise probability for glandular tissue is calculated with regard to all pixels within the breast area of the mammogram, and its average value is used to represent the mammographic density.

According to another exemplary embodiment, the pixels having a 50% probability of being the glandular tissue are selected to segment the dense region, and thus a ratio of such a segmented dense region to the whole breast area is calculated to obtain a percent breast density.

According to still another exemplary embodiment, the dense region is segmented by combining the pixel-wise tissue probability of a given mammogram with a region-based level set segmentation method, and then a ratio of the segmented dense region to the whole breast area is calculated to obtain a percent density. As a method of combining the prior probability with the Formula of the level set, this embodiment defines energy as follows.

$$E(\phi(x), c_{in}(\phi(x)), c_{out}(\phi(x))) = \\ E_{image}(\phi(x), c_{in}(\phi(x)), c_{out}(\phi(x))) + E_{prior}(\phi(x))$$ [Formula 15]

$$E_{image}(\phi(x), c_{in}, c_{out}) = \\ \int_\Omega |\nabla H(\phi(x))| dx + \int_\Omega (f(x) - c_{in}(\phi(x)))^2 H(\phi(x)) dx + \\ \int_\Omega (f(x) - c_{out}(\phi(x)))^2 (1 - H(\phi(x))) dx$$ [Formula 16]

-continued $$c_{in}(\phi(x)) = \frac{\int_\Omega f(x) H(\phi(x)) dx}{\int_\Omega H(\phi(x)) dx}$$ [Formula 17]

$$c_{out}(\phi(x)) = \frac{\int_\Omega f(x)(1 - H(\phi(x))) dx}{\int_\Omega (1 - H(\phi(x))) dx}$$ [Formula 18]

$$E_{prior}(\phi(x)) = -\int_\Omega \ln P_D(x) H(\phi(x)) dx - \\ \int_\Omega \ln P_F(x)(1 - H(\phi(x))) dx$$ [Formula 19]

As energy defined in Formula 15, $E_{image}$ is minimized when a contrast between an inside and an outside of a current zero level contour is maximized, which can be calculated independently of the prior probability information. In Formula 19, $E_{prior}$ is minimized when the prior probabilities PD and PF obtained in Formula 14 according to the tissues are maximized. To minimize the energy of Formula 15, Formula 21 is derived by transformation into a time-based function through Euler-Lagrange of Formula 20.

$$\frac{\partial E(\phi(x), c_{in}, c_{out})}{\partial \phi(x)} = -\frac{\partial \phi(x)}{\partial t}$$ [Formula 20]

$$\frac{\partial \phi(x)}{\partial t} = \delta(\phi(x)) \left[ div\left(\frac{\nabla \phi(x)}{|\nabla \phi(x)|}\right) - \\ (f(x) - c_{in})^2 + (f(x) - c_{out})^2 + \ln \frac{P_D(x)}{P_F(x)} \right]$$ [Formula 21]

The contour may be initialized by various methods. According to an exemplary embodiment, the contour is initialized with a plurality of regular circles having a certain size and position inside the breast area. Time evolution of the level set is terminated when an energy drop rate is reduced to a sufficiently small value or when the number of iterations reaches a predetermined maximum count.

As above, the inside of the contour drawn by the level set indicates the dense region, and the outside thereof indicates the fatty region. Accordingly, the density of the breast area is calculated by dividing the number of pixels, which belong to the dense region obtained after the time evolution of the level set is terminated, by the number of pixels within the whole breast area.

4. Display of Results

The mammographic density results are to be displayed to a user in a manner to facilitate easy recognition as well as verification of reliability of the results.

Because what a user takes are just numerical values about the mammographic density, presenting intermediate basis data in the form of an evidential image together with the numerical values could help a user verify the reliability of the results. For example, if a user is given a mammographic density of 1%, it is too small to be accepted by a user. However, if a user is given an image which displays that very few pixels have a probability of belong to the glandular tissue a user can easily accept the results.

According to an exemplary embodiment of the present invention, an evidential image for the mammographic density estimation is provided in a color coded form along with the numerical values of the mammographic density, and thus a user can intuitively grasp the reliability mammographic density estimation. For example, blue color may represent the mammographic density having a value of 0~24%, green color may represent 25~49%, yellow color may represent 50~74%, and red may represent 75% or higher. Here, the percent density divided with a 25% interval is based on standards for estimating the mammographic density, i.e., the breast imaging reporting and data system (BI-RADS).

According to one exemplary embodiment, if the mammographic density is calculated as an average of the pixel-wise tissue probabilities for glandular tissue, tissue probability of each pixel may undergo the color coding so that the color can be overlaid on the mammogram by an alpha blending method. For example, a pixel with 80% probability of the glandular tissue is alpha-blended with red, and a pixel with 20% probability is alpha-blended with blue. Therefore, a user can at a glance understand the basis of the density estimation results how the computer algorithm classified the pixels according to their tissue probability or otherwise grasp its appropriateness.

According to another exemplary embodiment, wherein the dense region is first segmented to estimate the mammographic density, the calculated mammographic density may be color coded and overlaid by the alpha blending method with regard to all pixels in the segmented dense region. For example, if a calculated value of the mammographic density is 23%, the segmented dense region is wholly alpha-blended with blue so that a user can at a glance grasp that it is less than 25% and easily check whether the glandular tissues are appropriately segmented.

According to still another exemplary embodiment wherein the dense region is segmented, in consideration of the uncertainty in computerized segmentation algorithm, a plurality of segmentation contours are generated by applying different internal settings to computerized segmentation algorithm and displayed to a user. For example, if the mammographic density calculated in the basic segmentation result is 23%, the contours of 18% and 28%, i.e., under and over segmentation by 5%, are displayed at the same time together with their numerical values. At this time, the contours may be color coded and overlaid as described above so that a user can quickly check the level of estimated breast density. In this way, a plurality of contours according to different segmentation level of the dense region are displayed on a mammogram, so that a user can select a contour most consistent with his/her judgment and easily take a value of the corresponding mammographic density.

In brief, the method of displaying the estimation result of the breast density to a user is as follows: the method includes the step of generating the evidential image with color-codes according to the basis data of the respective pixels and overlaid on the interest mammogram; and the step of displaying the evidential image together with characters including the numerical values. Here, the color coding of the basis data of the respective pixels is achieved by dividing the numerical values of the basis data with a 25% interval, applying preset color to each interval, and overlaying them to original pixel values through the alpha blending method. The basis data of respective pixels may refer to the probability that the respective pixels belong to the glandular tissue. In other embodiment, the basis data of the respective pixels may refer to the mammographic density calculated for the segmented dense region, and do not undergo the color coding if the respective pixels do not belong to the segmented dense region.

Preferably, the mammographic density estimation results includes a plurality of estimation results obtained by applying different internal settings to computerized segmentation algorithm, and such a plurality of segmentation results are displayed at the same time so that a user can select one most consistent with his/her judgment. When the plurality of results is provided, it is desirable to display the confidence of each result which is generated internally by the computer algorithm on a percentage basis with regard to the respective results.

Results

Visual Assessment of Contours for the Segmented Dense Region

FIGS. 9A, 9B, 9C, 9D, 9E and 9F show a glandular tissue segmentation process using the level set, in which an initial contour evolves as time goes on and finally converges to an outline of the dense region, according to the Formula 21.

In detail, FIGS. 9A, 9B, 9C, 9D, 9E and 9F show the evolution of the contours captured at 0, 5, 10, and 30 and at the final iterations for the segmented dense region. For all 100 mammograms, the final contours were found to be appropriate.

Figure 9A:
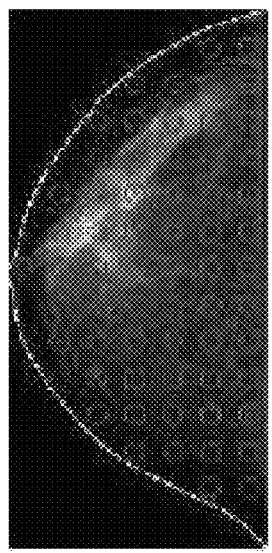
Figure 9B:
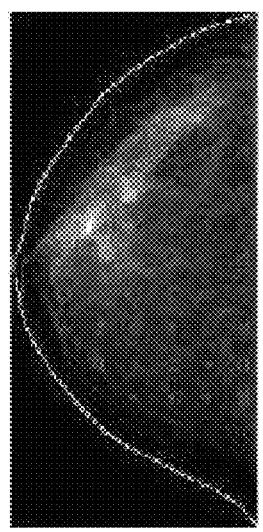
Figure 9C:
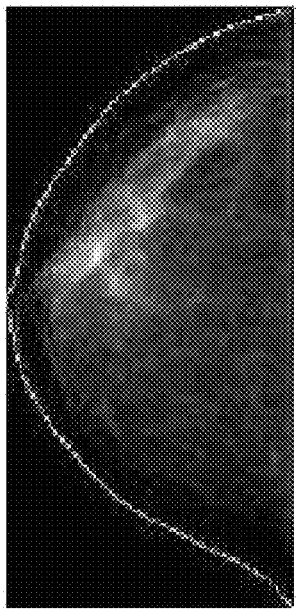
Figure 9D:
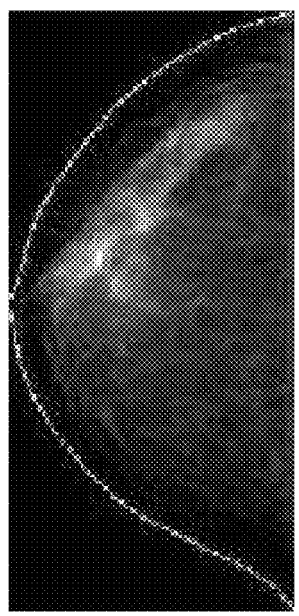
Figure 9E:
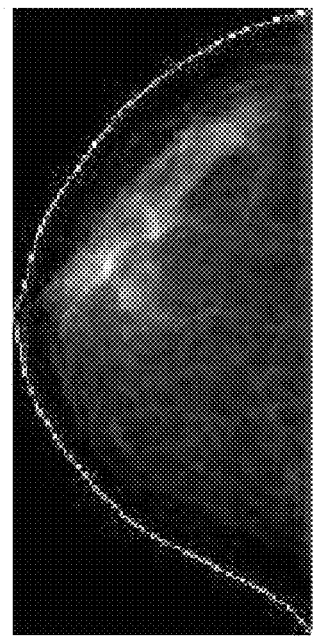
Figure 9F:
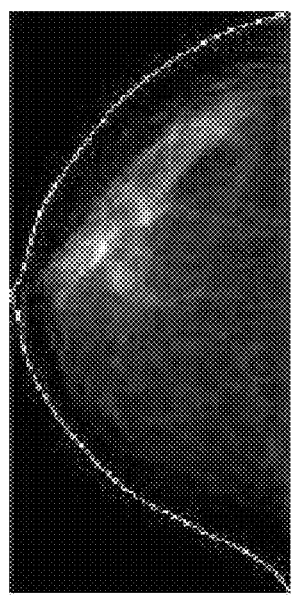
Figure 10A:
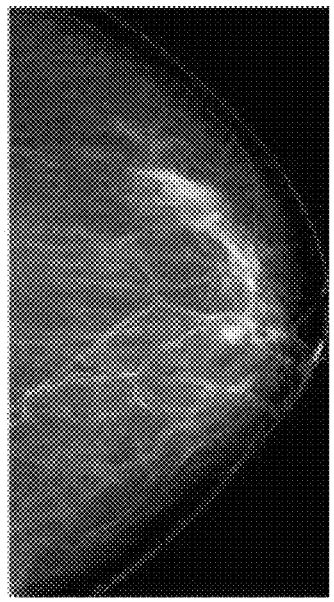
FIGS. 10A, 10B, 10C and 10D respectively show comparison between a final contour of the dense region segmentation generated by the method according to an embodiment of the present invention and a reference contour drawn by the radiologist.
Figure 10A:
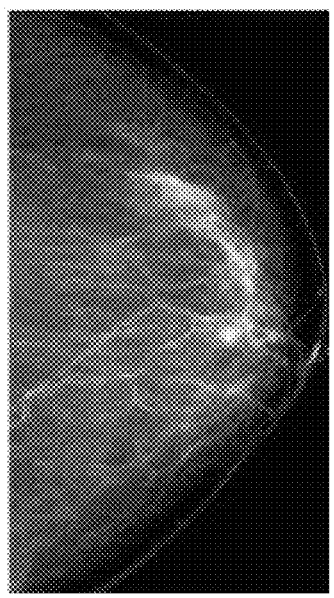
Figure 10B:
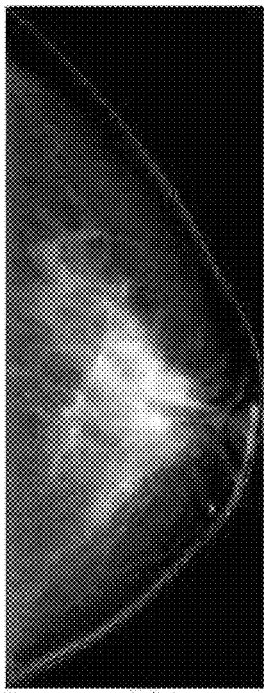
Figure 10B:
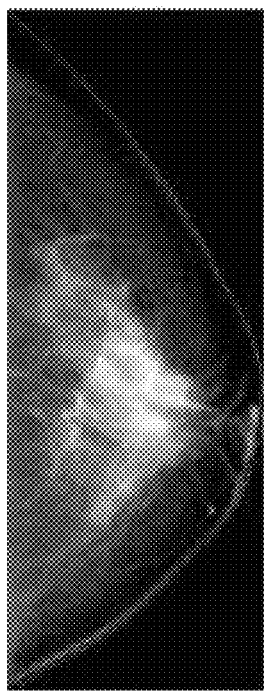
Figure 10C:
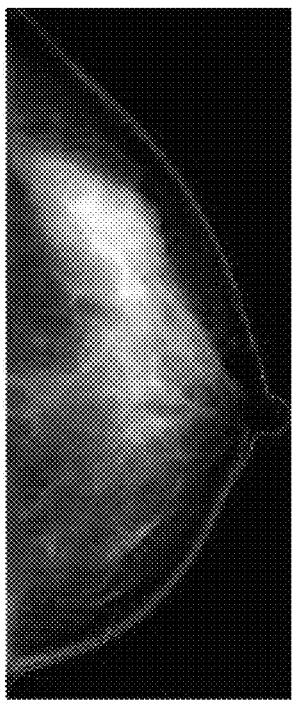
Figure 10C:
Figure 10D:
Figure 10D:

FIG. 9A: the initial contour, FIG. 9B: after 5 iterations, FIG. 9C: after 10 iterations, FIG. 9D: after 30 iterations, FIG. 9E: after 100 iterations, and FIG. 9F: a final result;

FIGS. 10A, 10B, 10C and 10D compare a final contour produced by the d present invention with the reference contour drawn by the experts. This shows that the contours produced by the present invention closely match with those drawn by the experts even for the cases with a hazy transition between two regions. Noteworthy is that the contours in FIG. 10B are smoother than those in FIG. 10A while their overall shapes are well preserved.

Agreement with Expert's Manual Mammographic Density Estimation

Three experts measured the density of 100 mammograms twice; thus there were six measurements per mammogram. Agreement between the density measurement of the experts and the automated estimation results according to the present invention was evaluated by Pearson correlation and shown to be 0.93.

Figure 11A:
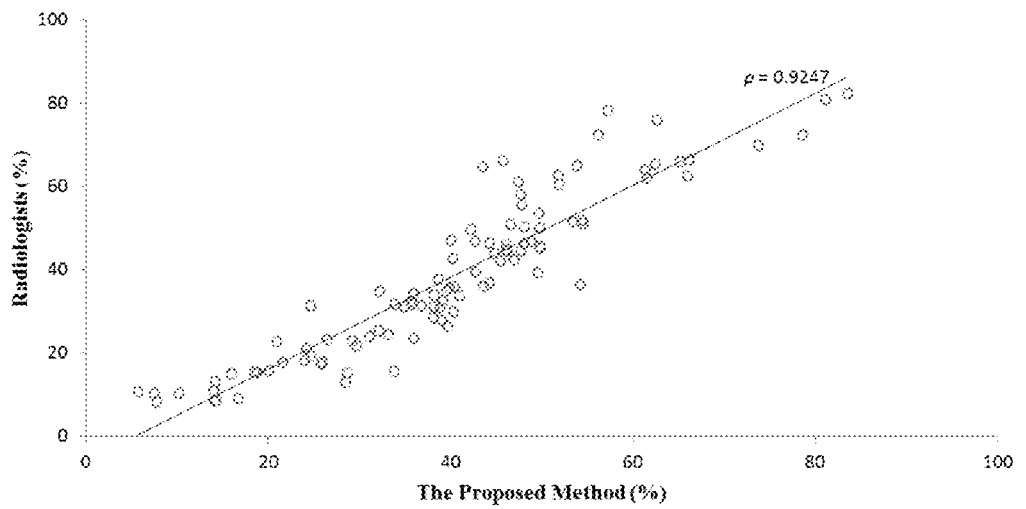
FIG. 11A is a scatter plot of percent density estimation of the radiologists with regard to the method proposed according to an embodiment of the present invention.

FIG. 11A shows the scatter plot of the expert's estimation percentage versus the disclosed method. Note that the data points are quite compactly distributed near the trend lines.

Also, for a comparison purpose, the performance of a conventional level set was also evaluated. The conventional level set in this specification refers to the Chan-Vese (CV) level set model [see IEEE Tr. on Image Processing, vol. 10, no. 2, February 2001].

Figure 11B:
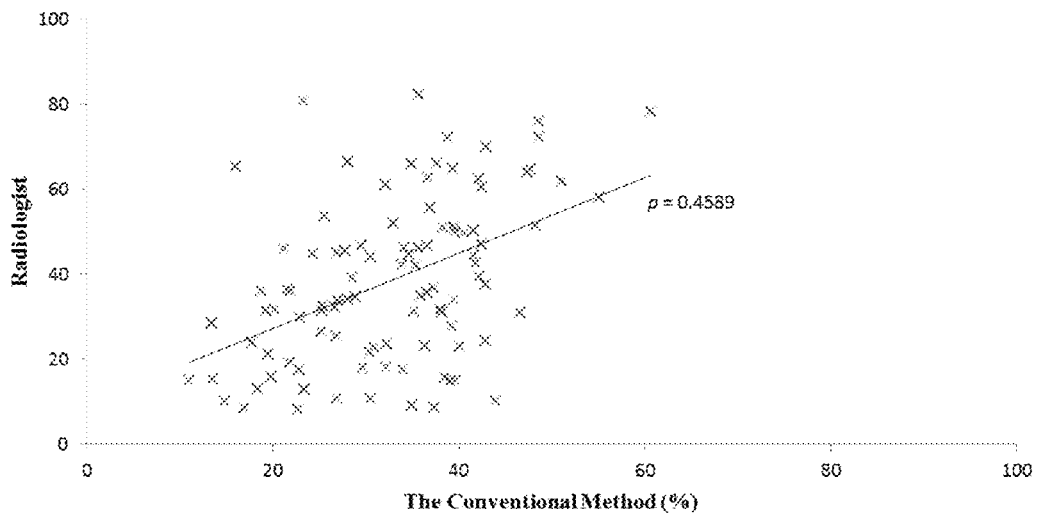
FIG. 11B is a 2D scatter plot of density estimation of the radiologists with regard to a conventional level set method.

The 2D scatter plot of the expert's density measurements in the conventional level set method are illustrated in FIG. 11B, in which the measurements are more widely scattered than those of FIG. 11A.

Figure 12A:
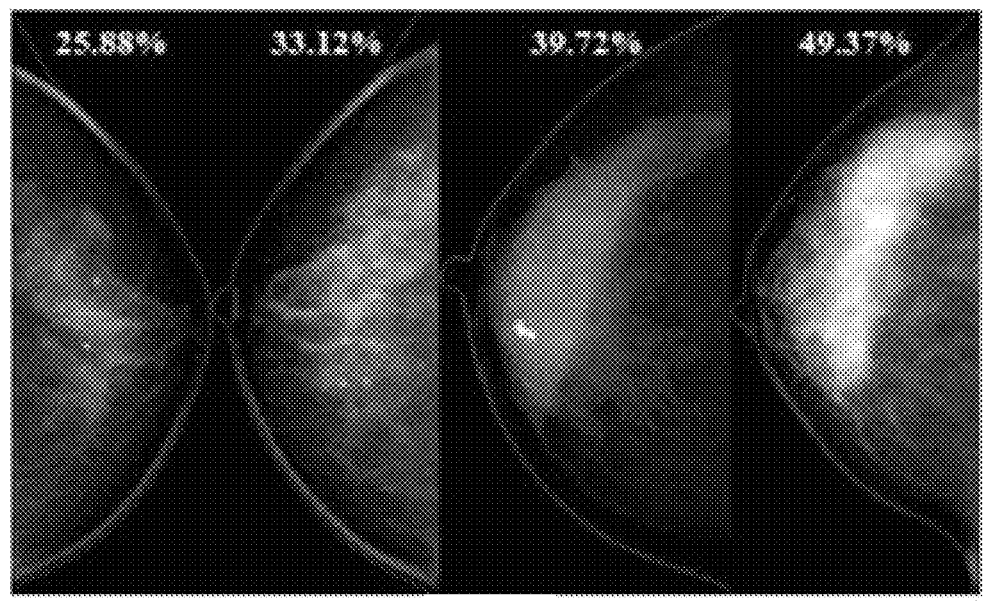
FIGS. 12A, 12B and 12C respectively compare contours segmented by the conventional level set with the present invention.
Figure 12B:
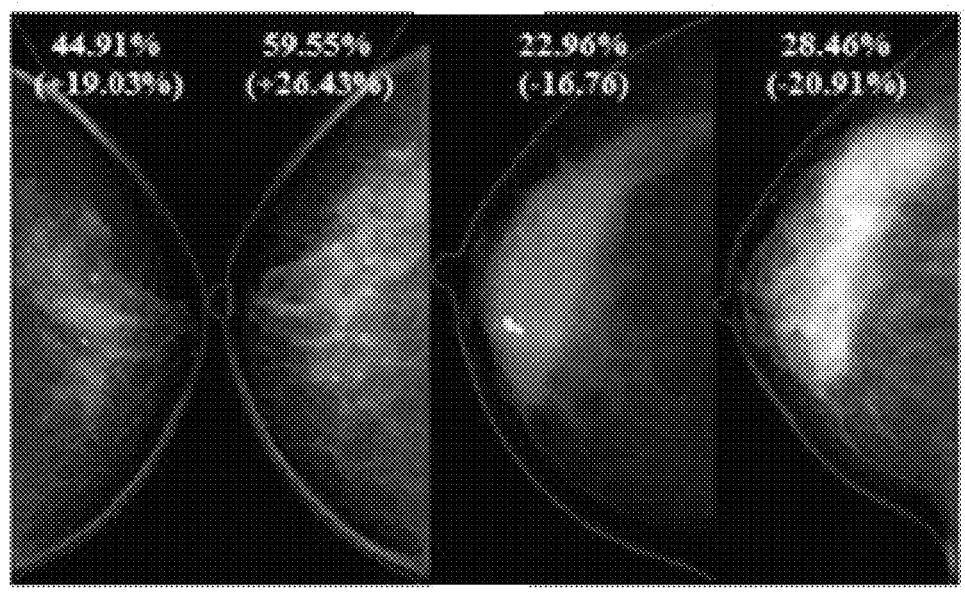
Figure 12C:
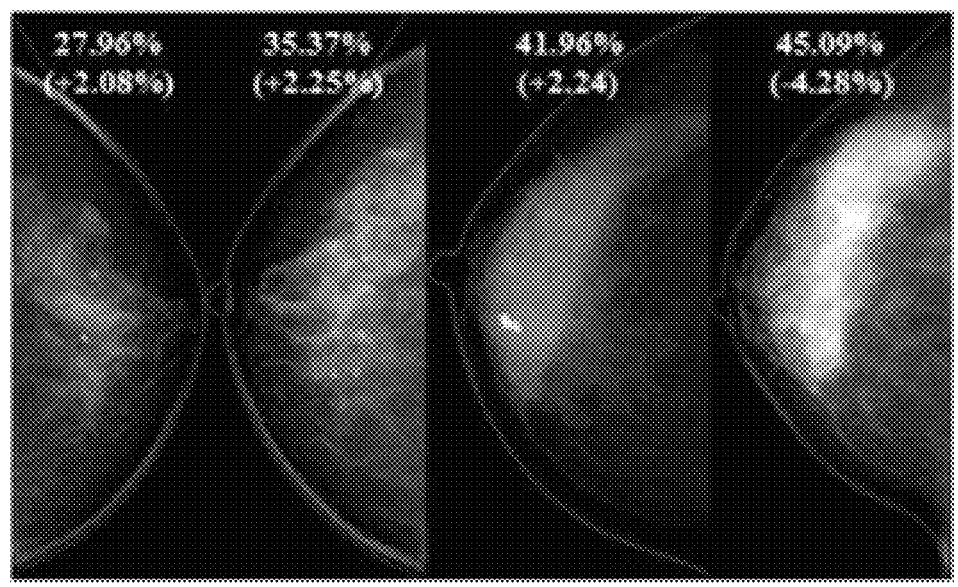

FIGS. 12A, 12B and 12C respectively show the segmented contours and density estimates by the conventional level set and by the present invention in comparison with the reference results for the selected mammograms, in which relatively large discrepancies are shown. While the conventional level set produced a wide range of discrepancies ranging from −16.76 to +26.43, the method according to the present invention gently narrowed the range from −4.28 to +2.25. Note that even for those difficult cases in which very haze intensity transitions exist between the two regions, the contours by the present invention generally agree well with the reference contours, whereas the contours by the conventional level set converged to a false boundary having a steeper transition.

According to an exemplary embodiment, there is provided a unique image segmentation method which enables robust estimations of mammographic density levels by incorporating learned knowledge from experts into a level set framework.

As described above, a major difficulty in segmenting the dense regions in a mammogram lies in the determination of a boundary on a hazy transition zone from a fatty region to the dense region, in which the intensity range of the two regions largely overlaps and does not show sufficient contrast. This property stems from the fact that a mammography is a projection of superimposed tissues consisting of different structures. This unique property makes it difficult to apply conventional segmentation techniques which are based on a simple image model assuming that the two regions are piecewise constant or have separable histograms.

The motivation of the present invention was the notion that an expert could segment out a dense region even with extremely difficult mammograms and thus the incorporation of learned knowledge into a segmentation method may lead to a novel method that can overcome the known challenges.

In this exemplary embodiment, the learned knowledge is captured from experts by extracting local statistics of both dense and fatty regions in a mammogram set of a patient population and a PTPM which was in turn incorporated into a level set framework is constructed. Although this exemplary embodiment employed only the mean and standard deviation for ROI statistics, additional texture features could be regarded, such as skewness, kurtosis, or the structure tensor. In estimating the PDF with the local statistics of finite measurements, the nonparametric PDF estimation scheme termed Parzen Window is employed, which is particularly attractive when there is no guarantee that the PDF would follow a parametric function. In fact, it is found that the fitted Gaussian PDFs using the maximum likelihood estimation (MLE) method produced large errors, particularly at the transition zone where the local statistics were only sparsely sampled. The improved accuracy in estimating the PDFs using this nonparametric scheme partly contributed to the overall high performance of the present invention.

In the quantitative evaluation experiment, the present invention produced a Pearson correlation coefficient of 0.93, which ranks as one of the highest values considering the reported performance levels in previous methods.

This high performance is due to ability to accomplish a robust segmentation task. In this sense, the present invention outperformed ordinary human observers as well as the conventional segmentation methods. Considering the limitations of previous methods, in which outliers were inevitably produced and led to a degradation of the overall performance and reliability, the robustness shown in the experimental results can be regarded as a unique strength of the present invention. It is to be appreciated that the present invention has been described by way of several embodiments, with modifications and alternatives, but having read and understood this description, further embodiments and modifications will be apparent to those skilled in the art. All such embodiments and modifications are intended to fall within the scope of the present invention as defined in the accompanying claims.

What is claimed is:

1. An automated mammographic density estimation method using prior probability information, the method comprising steps of:

constructing a population-based tissue probability map (PTPM) by extracting tissue probability information from a plurality of image area previously segmented by at least one expert according to the dense and fatty regions in a preprocessed mammogram of a population; and estimating the density by applying the population-based tissue probability map (PTPM) to a preprocessed interest mammogram to obtain pixel-wise tissue probability followed by calculating the percent mammographic density, wherein extracting the tissue probability information in the constructing the population-based tissue probability map (PTPM) comprises calculating local statistical feature set from the plurality of region of interest sampled within the image area previously segmented by the expert according to the dense and fatty tissue types, and obtaining tissue probability density functions for the dense and fatty tissue types in a local statistical feature space, wherein constructing the tissue probability map from a tissue probability density function in the constructing the population-based tissue probability map (PTPM) is derived by a proportion of each tissue probability density function to the sum of the dense and fatty tissue probability density functions.

2. The method according to claim 1, wherein the preprocessing comprises setting the increase in pixel values to have the same direction as the increase in X-ray attenuation, segmenting the breast area from the mammogram, and shifting the pixel values in the segmented breast area.

3. The method according to claim 2, wherein segmenting the breast area comprises taking a mode value of an image histogram, obtaining a standard deviation in a histogram region having a Gaussian form centered on the mode value, determining a threshold value of the breast area with a weighted sum of the mode value and the standard deviation, and performing thresholding of the pixel values.

4. The method according to claim 2, wherein shifting of pixel values comprises determining an offset intensity by finding a pixel value at which a histogram value obtained from the segmented breast area first reaches a preset threshold, and carrying out an intensity shift operation by subtracting the offset intensity from all pixel values in the breast area.

5. The method according to claim 1, wherein the local statistical feature set comprises the mean value and standard deviation which are obtained in a local region of interest defined in a form of a circle.

6. The method according to claim 1, wherein the tissue probability density function is obtained by a nonparametric probability density estimation scheme.

7. An automated mammographic density estimation method using prior probability information, the method comprising steps of:

constructing a population-based tissue probability map (PTPM) by extracting tissue probability information from a plurality of image area previously segmented by at least one expert according to the dense and fatty regions in a preprocessed mammogram of a population; and estimating the density by applying the population-based tissue probability map (PTPM) to a preprocessed interest mammogram to obtain pixel-wise tissue probability followed by calculating the percent mammographic density, wherein extracting the tissue probability information in the constructing the population-based tissue probability map (PTPM) comprises calculating local statistical feature set from the plurality of region of interest sampled within the image area previously segmented by the expert according to the dense and fatty tissue types, and obtaining tissue probability density functions for the dense and fatty tissue types in a local statistical feature space, wherein the tissue probability density function is obtained by a nonparametric probability density estimation scheme, and wherein the nonparametric probability density estimation scheme comprises a Parzen Window method.

8. The method according to claim 1, wherein the pixel-wise tissue probability in the density estimation step is obtained by setting up a local region of interest centered at each pixel in the segmented breast area of the interest mammogram, and applying the local statistical feature set to the population-based tissue probability map (PTPM).

9. The method according to claim 1, wherein calculating the breast density based on the pixel-wise tissue probability in the density estimation step is carried out by calculating the average of pixel-wise tissue probability for all the pixels within the segmented breast area.

10. The method according to claim 1, wherein calculating the breast density based on the pixel-wise tissue probability in the density estimation step comprises determining a dense region by selecting pixels having a 50% or higher probability of glandular tissues, and calculating a percent mammographic density by dividing the number of pixels corresponding to the said dense region by the total number of pixels within the segmented breast area.

11. The method according to claim 1, wherein calculating the breast density based on the pixel-wise tissue probability in the density estimation step comprises determining the dense region by applying a region-based level set segmentation method wherein the tissue probability is combined, followed by calculating the percent mammographic density by dividing the number of pixels corresponding to the said dense region by the total number of pixels within the segmented breast area.

12. A method of displaying the mammographic density estimation results comprising:
generating an evidential image in which the basis data of respective pixels in the intermediate estimation result are color coded and overlaid on the interest mammogram; and
displaying text characters including to the numerical values of estimation results on the evidential image,
wherein the mammographic density estimation results are obtained with an automated mammographic density estimation method using prior probability information, the automated mammographic density estimation method comprising steps of:
constructing a population-based tissue probability map (PTPM) by extracting tissue probability information from a plurality of image area previously segmented by at least one expert according to the dense and fatty regions in a preprocessed mammogram of a population; and
estimating the density by applying the population-based tissue probability map (PTPM) to a preprocessed interest mammogram to obtain pixel-wise tissue probability followed by calculating the percent mammographic density,
wherein extracting the tissue probability information in the constructing the population-based tissue probability map (PTPM) comprises calculating local statistical feature set from the plurality of region of interest sampled within the image area previously segmented by the expert according to the dense and fatty tissue types, and obtaining tissue probability density functions for the dense and fatty tissue types in a local statistical feature space, and
wherein constructing the tissue probability map from a tissue probability density function in the constructing the population-based tissue probability map (PTPM) is derived by a proportion of each tissue probability density function to the sum of the dense and fatty tissue probability density functions.

13. An automated mammographic density estimation system for carrying out an automated mammographic density estimation method comprising:
constructing a population-based tissue probability map (PTPM) by extracting tissue probability information from a plurality of image area previously segmented by at least one expert according to the dense and fatty regions in a preprocessed mammogram of a population; and
estimating the density by applying the population-based tissue probability map (PTPM) to a preprocessed interest mammogram to obtain pixel-wise tissue probability followed by calculating the percent mammographic density,
wherein extracting the tissue probability information in the constructing the population-based tissue probability map (PTPM) comprises calculating local statistical feature set from the plurality of region of interest sampled within the image area previously segmented by the expert according to the dense and fatty tissue types, and obtaining tissue probability density functions for the dense and fatty tissue types in a local statistical feature space, and
wherein constructing the tissue probability map from a tissue probability density function in the constructing the population-based tissue probability map (PTPM) is derived by a proportion of each tissue probability density function to the sum of the dense and fatty tissue probability density functions.

14. A non-transitory media for storing a computer program, wherein the computer program stored in the media comprises a computer algorithm provided for implementing an automated mammographic density estimation method comprising:
constructing a population-based tissue probability map (PTPM) by extracting tissue probability information from a plurality of image area previously segmented by at least one expert according to the dense and fatty regions in a preprocessed mammogram of a population; and
estimating the density by applying the population-based tissue probability map (PTPM) to a preprocessed interest mammogram to obtain pixel-wise tissue probability followed by calculating the percent mammographic density,
wherein extracting the tissue probability information in the constructing the population-based tissue probability map (PTPM) comprises calculating local statistical feature set from the plurality of region of interest sampled within the image area previously segmented by the expert according to the dense and fatty tissue types, and obtaining tissue probability density functions for the dense and fatty tissue types in a local statistical feature space, and
wherein constructing the tissue probability map from a tissue probability density function in the constructing the population-based tissue probability map (PTPM) is derived by a proportion of each tissue probability density function to the sum of the dense and fatty tissue probability density functions.

* * * * *